United States Patent Office 2,974,161
Patented Mar. 7, 1961

2,974,161

OLEFIN OXIDATION WITH A SOLID CALCINED CATALYST

Willis C. Keith, Lansing, and Emmett H. Burk, Jr., Hazel Crest, Ill., and Carl D. Keith, Summit, N.J., assignors to Sinclair Refining Company, New York, N.Y., a corporation of Maine No Drawing. Filed Apr. 25, 1958, Ser. No. 730,831

5 Claims. (Cl. 260—491)

The present invention relates to the oxidation of unsaturated organic compounds and more particularly the present invention pertains to the liquid phase oxidation of organic compounds having at least one aliphatic or cycloaliphatic olefinic linkage in the molecule. The oxidation is conducted in the presence of molecular oxygen by contacting the unsaturated compound with a calcined solid oxidation catalyst.

In the past numerous methods have been utilized to bring about the production of various oxygenated compounds by the air oxidation of unsaturated organic compounds and these have included both catalytic and non-catalytic procedures conducted in either the liquid or the vapor phase. Generally, the most useful of these procedures have been those wherein the oxidation of the unsaturated compound is conducted in the liquid phase in the presence of a catalyst and an oxygen-containing gas. In these procedures the oxidation catalyst is usually in the form of a soluble salt of an active metal, e.g. cobalt toluate or naphthenate, and is in solution in the reaction mixture. The oxidation of unsaturated compounds by these soluble catalyst procedures has proven somewhat effective. However, due primarily to the solubility of catalyst salt in the reaction mixture, there are certain disadvantages in the reaction system and these include, among others, the loss of the catalyst from the reaction system thus leading to increased operational cost, and the necessity of providing elaborate catalyst recovery facilities to separate the catalyst and reaction products. We are aware of certain prior disclosures, for instance those in U.S. Patent No. 1,935,054; however, this patent does not describe the advantageous system of our present invention.

In accordance with the present invention we provide for the catalytic liquid phase oxidation of olefinic organic compounds by effecting the oxidation in the presence of a molecular oxygen-containing gas and a catalytic amount of a catalyst obtained by calcination of a material containing a promoting metal of atomic number of 24 to 28 supported on a solid inorganic base consisting essentially of silica, alumina or their mixtures. By proceeding in this manner we substantially eliminate many of the heretofore encountered difficulties in liquid phase oxidation reactions such as catalyst losses from the system and the necessity of providing elaborate means for the separation of the catalyst and the reaction product, and we obtain substantial yields of oxygenated products such as oxides, alcohols, aldehydes, esters, ketones and acids with the exact nature of the products depending upon the severity of the reaction conditions and the feedstock employed.

The unsaturated organic compounds which can be oxidized in accordance with the present invention can generally be those organic compounds which contain at least one olefinic carbon to carbon aliphatic or cycloaliphatic linkage. The unsaturated compound can contain from 2 up to as many as 18 carbon atoms and preferably the compound will contain from 3 to 10 carbon atoms. The unsaturated compound can be substituted as with an aromatic or other hydrocarbon or non-hydrocarbon group. Thus various compounds such as unsaturated esters, acids, etc. can be oxidized in accordance with the present teachings as well as partially oxidized compounds such as unsaturated alcohols, ketones and aldehydes. Typical unsaturated organic compounds which are capable of being oxidized by the present procedure can be listed as follows: ethylene, propylene, butene, butadiene, pentene, pentadiene, cyclohexene, methylcyclohexene, styrene, methylstyrene, allyl acetate, propenol, butenol, etc.

In some instances it may be advantageous to have present in the oxidation system a solvent inert to the reactants and stable under the reaction conditions in order to provide the reactants in the liquid phase. For instance, in oxidizing low molecular weight olefins such as $C_5$'s or less a solvent is present to insure the liquid phase at the reaction temperatures. When oxidizing pentenes or above the solvent may or may not be present as desired since the pressure can be sufficient to insure the liquid phase at the reaction temperature even in the absence of a solvent. Suitable solvents are polar organic liquids such as acetic acid or other low molecular weight monocarboxylic acids or the solvent can be benzene or another hydrocarbon if desired. The solvent can be provided in any quantity with no particular advantage being obtained by having amounts outside of the range of about 0.1 to 10 volumes per volume of olefinic feed. When glycols are the desired product of the oxidation reaction, we find it particularly advantageous to use acetic acid as the solvent medium. When operating in the absence of an organic polar solvent, it is preferred to remove substantially all of the water from the reaction zone as it is formed. When so doing it may be advantageous to employ a hydrocarbon solvent, for instance an aromatic hydrocarbon such as benzene, to facilitate handling of the products, particularly when conversion of the feedstock is over 50 percent.

The conditions for the oxidation reaction are generally conventional in the liquid catalyst art. The elevated temperature can be in the range of about 50 to 300° C. and preferably about 70 to 200° C. with a pressure on the system sufficient to insure a substantial amount of the reactants in the liquid phase. For instance, pressures in the range of about 0 to 3000 p.s.i.g. and preferably about 0 to 1000 p.s.i.g. will usually suffice. In general, the space velocity will be from about 0.05 to 10 WHSV (weight of feed per weight of catalyst per hour) with the catalyst being sufficient to provide a substantial catalytic effect.

The catalyst for use in the present invention is derived by calcining an inorganic base having deposited thereon catalytic amounts of a promoting metal component. The catalyst can be prepared as by conventional procedures such as the co-precipitation of the promoting metal component with the base in hydrated form followed by calcination or the base can be preformed, calcined if desired, and then the promoting metal component deposited thereon as by contact with a salt solution of the metal component followed by calcination. In either method the base precursor, as a hydrate or a previously calcined hydrate, containing the promoting metal, must be activated as by calcination prior to use in the oxidation reaction. Thus the catalyst base calcined for use in the present invention is comprised predominantly of alumina, silica, or mixtures thereof and preferably the calcined material contains at least some amount of silicate or aluminate of the promoting metal. The base can also contain minor amounts of other inorganic materials, such as magnesia or other inorganic oxides.

In forming the base by precipitation from an aluminum salt, the aluminum in the salt can be in the cationic or anionic portion. If the aluminum is in the anionic part for instance as in sodium aluminate, and the aluminum salt is combined with a compound of the promoting metal for instance cobalt nitrate the resultant precipitate will, upon calcination, be predominantly in the spinel or aluminate form and if the aluminum in the salt is cationic, the resultant precipitate will, upon calcination, be predominantly in the alumina form. Likewise, when silica is desired in the inorganic base, its form can be controlled in a similar manner to provide predominantly silicate or silica, as the case may be.

The catalytically active metal component can be impregnated or deposited on the solid inorganic base and this can be done as by mixing the base with an aqueous solution of a water-soluble salt of the desired catalytic metal to absorb all or a part of the metal-containing solution in the base particles, or alternatively, we can precipitate the active metal component on the base through neutralization of a slurry of the salt of the desired base and the acid salts of the catalytic metal. In either case, or if prepared by some other method, the catalyst must be calcined before use in our oxidation system with the calcination being conducted at a temperature of about 250 to 700° C., preferably at least about 350° C., for a time sufficient to remove the predominant amount, but not all, of the water of hydration.

The promoting metal component of the catalyst can be a metal or mixture of metals having atomic numbers from 24 to 28, i. e., chromium, manganese, iron, cobalt and nickel, with cobalt being preferred. Generally, the metal is deposited on the base as the oxide or in a form that gives the oxide upon calcination, although other combined forms of the metal can be employed. The promoting metal will be provided in the catalyst in amounts of about 0.1 to 2.0 times the weight of the supporting base with a ratio of about 0.5 to 1.5 weight of promoting metal to 1 weight of base being preferred. These amounts are calculated on the basis of the promoting metal and base oxides. In some cases, it may be found desirable to provide initiators in the oxidation system and these can be various peroxides or free radical-producing substances such as ketones, etc.

The present invention may be more fully understood by reference to the following specific examples which are not to be considered as limiting its scope.

*Example I*

A catalyst useful in the present process was prepared as follows: In sufficient water to form 18 liters of solution were added 995 ml. of cobalt nitrate (200 gms. Co) and 5500 gms. of aluminum nitrate ($Al[NO_3]_3 \cdot 9H_2O$). A second solution containing 3360 grams of sodium carbonate diluted in 32 liters of $H_2O$ was formed. This second solution, made up in a 35 gal. stainless steel jacketed Pfaudler kettle, was heated to about 85 to 90° C. The first solution was then added to the sodium carbonate solution over a period of 30 minutes with vigorous agitation. After the precipitation was complete the heat was discontinued and the resultant slurry stirred for an additional thirty minutes. The mixture was then filtered through a plate and frame press. After filtration the cake was washed with hot deionized water and dried with air. The dried hydrate cake was then reslurried and rewashed an additional four times with hot deionized water and finally dried in a forced air oven at 105° C. The washed and dried filter cake was ground to a powder and calcined at 350° F. This procedure yielded about 1000 gms. of catalyst on an ignited weight basis and it contained about 18.4 percent cobalt.

*Example II*

A solution was prepared containing about 825 gms. of nickel nitrate ($Ni[NO_3]_2 \cdot 6H_2O$) and about 100 ml. of concentrated nitric acid. This solution, noted solution A, was diluted with about 4 liters of water. A second solution, noted B, was prepared by dissolving in about 4 liters of water 635 gms. of sodium aluminate. Solutions A and B were added simultaneously to 8 liters of deionized water over a ½ hour period with vigorous stirring. The pH was maintained at 6.5 to 7.5. The slurry had a final pH of 8.5 and was adjusted to 6.5 by the addition of nitric acid. The slurry was filtered and the cake dried at 110° C. The dried filter cake was washed with deionized water until free of sodium ions. The hydrate cake was then dried at 110° C., ground and pelleted. The dried pellets were calcined at 480° C. for 6 hours. X-ray diffraction analysis of the calcined catalyst showed small crystals of $NiAl_2O_4$. The catalyst analyzed 41.5% $NiO_2$ and 57.1% $Al_2O_3$. The crystals had a nitrogen area of about 240 square meters per gram, and a total pore volume of about 0.750 cc./g.

*Example III*

A cobalt catalyst was prepared substantially as described in Example II by substituting an equal molar amount of cobalt nitrate for the nickel nitrate. This catalyst showed small crystals of cobalt aluminate and had 42.4% by weight CoO contained therein.

*Example IV*

25 gms. of a catalyst prepared as described in Example I was ground to a powder and recalcined for 2 hours at 510° C. This catalyst was charged into an atmospheric jacketed glass reactor along with a solution containing 86 grams of cyclohexene and 214 grams of glacial acetic acid. The mixture was heated to 80° C. and pure oxygen was introduced at a rate of 0.5 ft.$^3$/hr. At the end of 1 hour, 42% of the oxygen had been converted to oxidation products. The oxidation reaction was continued for an additional 4 hours. At the end of the 5 hours a total of 32% of the oxygen had been converted to oxidation products. No CO or $CO_2$ was formed during the reaction. The oxidation product was removed by filtration leaving the solid catalyst in the reactor. The reactor was recharged with fresh feed and the above experiment repeated six times. The product from all these runs was composited and fractionated. The analysis showed that 54.5% of the cyclohexene had been converted to oxidation products with the major products being as follows:

Cyclohexenone-3
3-acetooxycyclohexene
1,2-cyclohexanediol-di-acetate
High boiling alkali soluble product

*Example V*

The same reactor and same catalyst as used in Example IV above were also used in a continuous type operation. The conditions of temperature and oxygen introduction were the same as set forth in Example IV. The cyclohexene feedstock was continuously fed into the reactor at a liquid hourly space velocity of about 0.1. After 23 hours of continuous operation in this manner the system reached an equilibrium and during the next 50 hours about 20% of the oxygen introduced was converted to oxidation products. The catalyst retained its activity throughout the run. The product balance showed that 60.3% of the hydrocarbon feedstock was converted to oxidation products and that no CO or $CO_2$ was formed. The major products were substantially as set forth in Example IV above.

The catalyst was removed from the reactor, dried and calcined at 510° C. Analysis of the used catalyst showed no significant change in the percent cobalt and the X-ray diffraction patterns of the virgin and used catalyst were identical.

*Example VI*

This run was carried out in a 4-neck fluted flask equipped with a thermowell, condenser, stirrer and a gas dispersion tube. 10 gms. of the catalyst described in Example I above was ground to pass 200 mesh and calcined at 510° C. for 2 hours. This catalyst was charged to the 4-neck flask along with 500 grams of alpha-methylstyrene and 1500 gms. of glacial acetic acid. The mixture was heated to about 80° C. and oxygen was introduced at a rate of about 0.5 ft.$^3$/hr. After about 2 hours very little oxidation had taken place. At this time 3 mls. of cumene hydroperoxide were added and within a few minutes the temperature increased to 90° C. At this point substantially all the oxygen introduced was converted. The reaction was cooled to 80° C. and this temperature maintained throughout the remainder of the run. The reaction was allowed to proceed for 7.6 hours after which it was stopped and the products removed by filtration. The catalyst remaining in the flask was reused with excellent results. Work up of the product showed that over 90% of the feedstock had been converted to oxidation products with the major products being as follows:

Acetophenone.
Unsaturated esters, boiling at 121–132° C. at 10 mm.
Products boiling at 141–143° C. at 0.7 mm.
A high boiling residue.

*Example VII*

A 1-gal. high pressure stirred autoclave, equipped with a knock-out condenser was used in this run. The same catalyst as used in Example VI was charged into the autoclave along with 500 g. of alpha-methylstyrene and 1500 gms. of glacial acetic acid. The autoclave was heated to 115° C. and this temperature maintained throughout the run. The air pressure on the autoclave was controlled at about 540 p.s.i.g. and the effluent gas rate at about 8 ft.$^3$/hr. At the end of 2 hours the autoclave was cooled and the products removed. The catalyst was separated by filtration and the product balance showed 98% conversion of the feedstock to oxidation products with the major products being substantially the same as in Example VI.

*Example VIII*

10 gms. of a catalyst as described in Example I was ground to pass 200 mesh and recalcined for 2 hours at 510° C. The catalyst was then charged to a reactor along with 200 gms. of allyl acetate, 5 gms. methylethylketone and 200 gms. of glacial acetic acid. The reaction was carried out at 150° C. and under an air pressure of 500 p.s.i.g. Air was introduced at a rate of about 4 cubic feet per hour for 5 hours. The product was removed from the reactor and the catalyst separated by filtration. Partial conversion of the allyl acetate took place and 282 gms. of glycerine esters were obtained.

*Example IX*

120 gms. of catalyst prepared as described in Example I was granulated to give 8/14 mesh particle size and calcined for 2 hours at 510° C. This catalyst was charged to a jacketed steel pressure reactor, that is designed for running liquid phase reactions in a fixed catalyst bed. Air was introduced at the bottom of the reactor through a porous diffusion plate, and at a rate equivalent to 0.8 moles of oxygen per mole of butene-2 feed. The olefin (butene-2) was premixed with 3 volumes of benzene and introduced into the reactor at a point just above the gas diffusion plate at a rate of 0.5 WHSV. The conditions for this run were 800 p.s.i.g. pressure and a jacket temperature of 170° C. The reaction was allowed to continue for a period of 7 hours. Gas samples were taken at frequent time intervals and analyzed. The analyses indicated that most of the oxygen was being converted to oxidation products. Some of the gas samples showed that over 97% of the oxygen was being converted to oxidation products, and that very little CO and $CO_2$ was formed. Distillation of the products showed that 40% of the butene-2 was converted to oxidation products. The following table gives the yield of products obtained from this reaction:

| Product | Yield (moles of product per 100 moles of butene-2 consumed) |
|---|---|
| Butylene oxide | 10 |
| Butylene glycol | 55 |
| Crotonyl alcohol and crotonic aldehyde | 10 |
| Low molecular weight product (mostly propionaldehyde) | 20 |
| $CO+CO_2$ | 20 |

*Example X*

A 10 gram sample of cobalt silicate catalyst prepared as described in Example III was ground to pass 200 mesh and calcined for 2 hours at 575° C. The catalyst and 381 grams of cyclohexene were charged to a glass jacketed slurry reactor. The mixture was heated to about 70° C. and oxygen was introduced at a rate of 0.5 ft.$^3$/hr. Reaction took place as soon as the oxygen was introduced; no induction period was observed. After 3 hours of oxidation time over 80% of the oxygen was being converted to oxidation products. Distillation of the products indicated that 44% of the cyclohexene was converted to oxidation products. The major products from the reaction were cyclohexenone and cyclohexenol in a ratio of 3:2. Only traces of other products were formed.

We claim:

1. In a method for the oxidation of an olefin hydrocarbon of 2 to 18 carbon atoms, the steps comprising contacting said olefin at a temperature of about 50 to 300° C. and a pressure sufficient to maintain the liquid phase and in the presence of molecular oxygen with a calcined solid oxidation catalyst containing a material selected from the group consisting of the silicates and aluminates of promoting metals having an atomic number of 24 to 28, said catalyst being obtained by calcination of a catalyst precursor prepared by the coprecipitation of a catalytic amount of said promoting metal with a solid inorganic base, in hydrated form, selected from the group consisting of alumina and silica, said calcination being at a temperature of about 250 to 700° C. for a time sufficient to remove the predominant amount, but not all, of the water of hydration.

2. The method of claim 1 in which the catalyst is obtained by calcination of alumina containing a catalytic amount of cobalt.

3. The method of claim 1 in which the solid inorganic base is silica and the promoting metal is cobalt.

4. In a method for the oxidation of allyl acetate to glycerine esters, the steps comprising contacting said allyl acetate at a temperature of about 50 to 300° C. and a pressure sufficient to maintain the liquid phase and in the presence of molecular oxygen with a calcined solid oxidation catalyst containing a material selected from the group consisting of the silicates and aluminates of promoting metals having an atomic number of 24 to 28, said catalyst being obtained by calcination of a catalyst precursor prepared by the coprecipitation of a catalytic amount of said promoting metal with a solid inorganic base, in hydrated form, selected from the group consisting of alumina and silica, said calcination being at a temperature of about 250 to 700° C. for a time sufficient to remove the predominant amount, but not all, of the water of hydration.

5. The method of claim 4 in which the solid inorganic base is alumina and the promoting metal is cobalt.

(References on following page)

References Cited in the file of this patent

UNITED STATES PATENTS

| | | |
|---|---|---|
| 1,935,054 | Jaeger | Nov. 14, 1933 |
| 2,197,101 | Eaglesfield | Apr. 16, 1940 |
| 2,316,604 | Loder et al. | Apr. 13, 1943 |
| 2,644,837 | Schweitzer | July 7, 1953 |
| 2,650,927 | Gasson et al. | Sept. 1, 1953 |
| 2,673,217 | Hull | Mar. 23, 1954 |
| 2,701,813 | Snyder | Feb. 8, 1955 |
| 2,741,623 | Millidge et al. | Apr. 10, 1956 |
| 2,769,846 | DiNardo et al. | Nov. 6, 1956 |
| 2,780,654 | Robertson et al. | Feb. 5, 1957 |
| 2,784,202 | Gardner et al. | Mar. 5, 1957 |